(No Model.) 3 Sheets—Sheet 1.

A. D. STEVENSON & G. F. WILSON.
OVEN AND ROLL FOR FLATTENING GLASS.

No. 262,495. Patented Aug. 8, 1882.

(No Model.) 3 Sheets—Sheet 2.
A. D. STEVENSON & G. F. WILSON.
OVEN AND ROLL FOR FLATTENING GLASS.
No. 262,495. Patented Aug. 8, 1882.
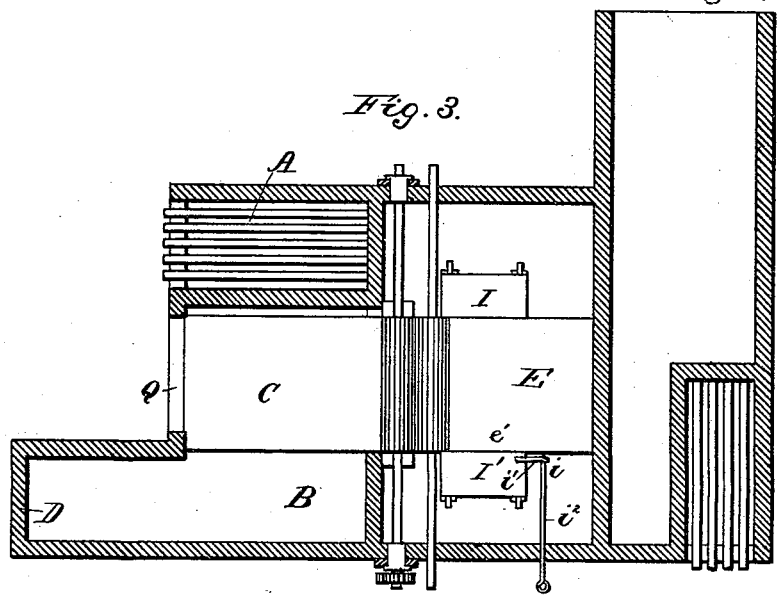
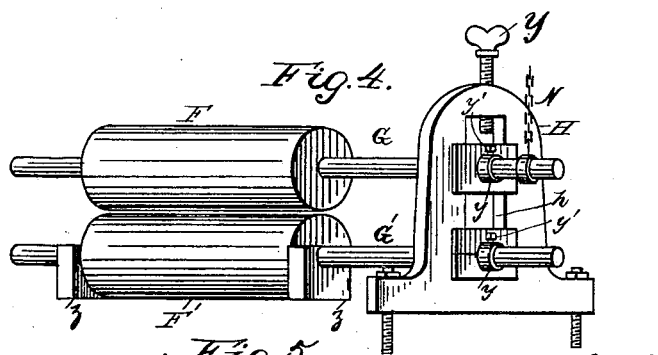
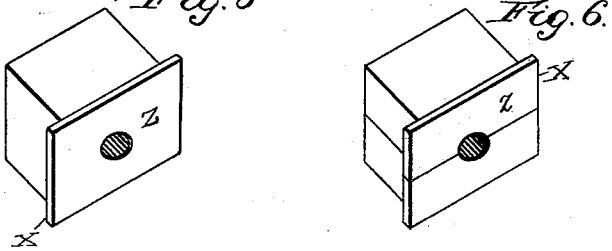
Witnesses:
Inventors:

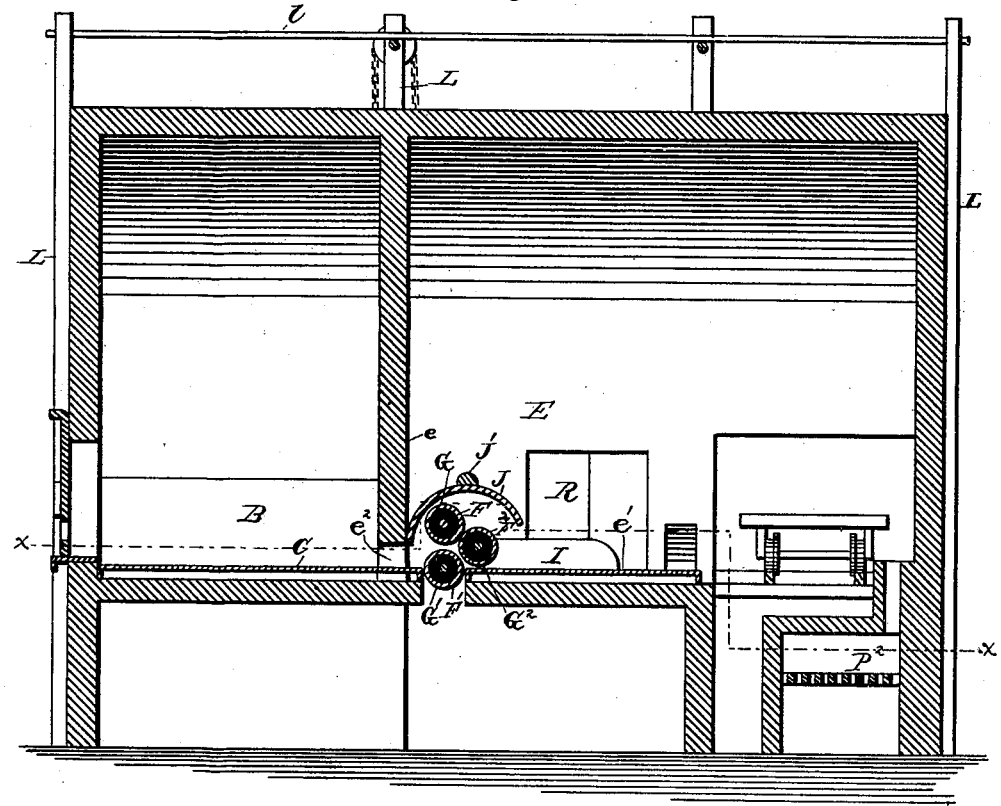

UNITED STATES PATENT OFFICE.

ALLEN D. STEVENSON AND GEORGE F. WILSON, OF NEW CASTLE, PA.

OVEN AND ROLL FOR FLATTENING GLASS.

SPECIFICATION forming part of Letters Patent No. 262,495, dated August 8, 1882.

Application filed May 15, 1882. (No model.)

*To all whom it may concern:*

Be it known that we, ALLEN D. STEVENSON and GEORGE F. WILSON, of New Castle, in the county of Lawrence and State of Pennsylvania, have invented certain new and useful Improvements in Ovens and Rolls for Flattening Glass; and we do hereby declare the following to be a full, clear, and exact description of the invention, such as will enable others skilled in the art to which it pertains to make and use the same.

Our invention relates to processes and mechanism for flattening glass, the object being to first blow the glass into cylinders, split the same, as is usual, and then pass it through flattening-rolls from the heating-chamber of an oven to a cooling-chamber, as will be fully described hereinafter.

A further object of the invention is to combine with a heating and cooling oven suitable rolls whereby the heated glass may be speedily rolled and flattened, with less labor and less liability to breakage of the glass than by the use of the present flattening devices.

A further object of the invention is to improve the construction of the oven, whereby the smoke of the furnace may be allowed to escape without annoyance to the workmen and the oven heated in less time than the ovens of ordinary construction.

The invention consists in first blowing the glass into cylinders, dividing or splitting the same, and then subjecting the cylinders so formed to heat within a heating-chamber, then passing the glass through flattening-rolls to a cooling-chamber, where it is cooled.

The invention further consists in the combination, with a heating and cooling oven, of a set of flattening-rolls mounted on shafts within the oven, said shafts being suitably geared together and adapted to be operated by any suitable motive power, and provided with a screen and devices for regulating the pressure of said rolls.

The invention further consists in the improved construction of oven, and the combinations of parts hereinafter fully described, and pointed out in the claims.

Figure 1:
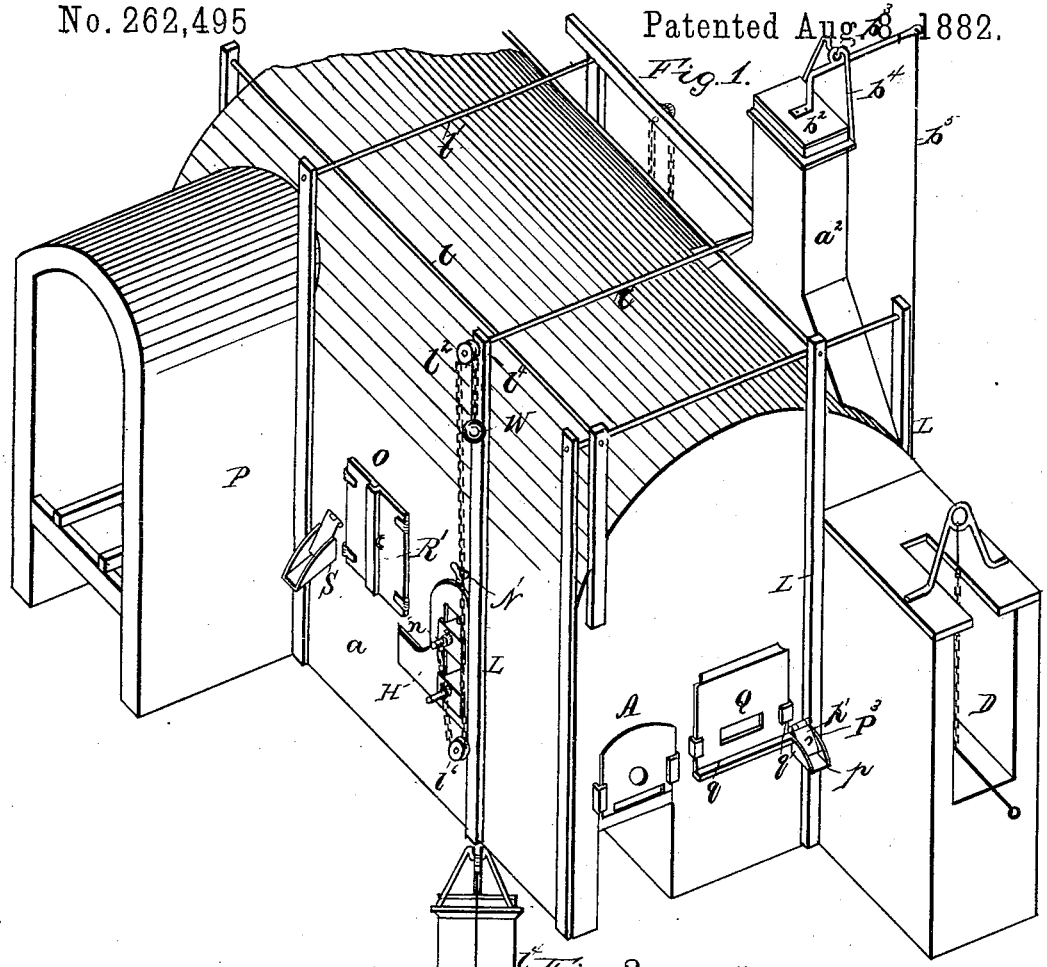
Figure 2:
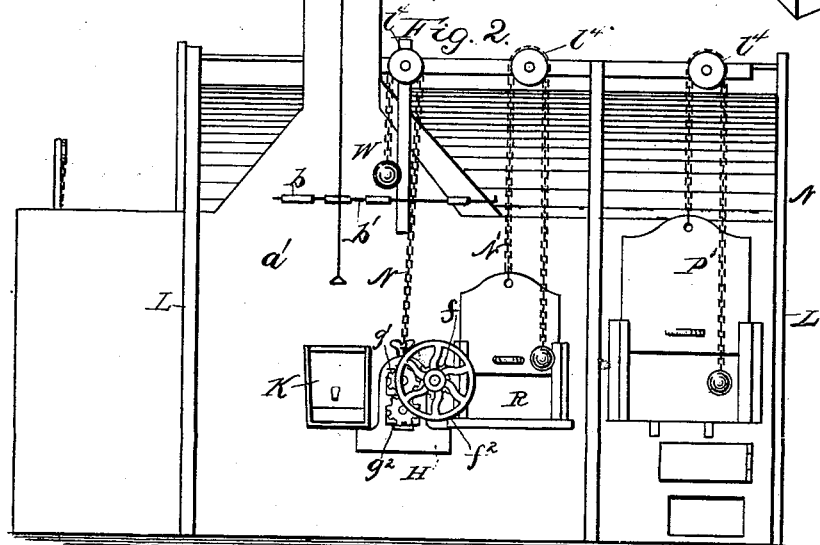

In the drawings, Figure 1 is a perspective view of an oven provided with our improvements. Fig. 2 is a side elevation of the same. Fig. 3 is a horizontal section on the line $x\,x$ of Fig. 8. Fig. 4 is a detached view of the rolls and the devices for adjusting and regulating them. Figs. 5 and 6 represent detached views of the shaft-bearings. Fig. 7 represents a pair of corrugated rolls, and Fig. 8 is a central longitudinal vertical section of Fig. 1.

A represents the fire-box of the oven, communicating with the heating-chamber B, the latter being provided with the usual flattening-stone, C.

D represents the feed-passage, arranged on the opposite side of the heating-chamber from the furnace A.

$a\,a'$ represent the side walls of the oven, and $a^2$ shows the chimney, located at the opposite side of the oven from the furnace, and provided with sliding dampers $b$, secured to a rod, $b'$, and with a cover, $b^2$, provided with an arm, $b^3$, pivotally supported in a bracket, $b^4$, as shown, and secured to a pull-rod, $b^5$.

E represents the cooling-chamber of the oven, arranged in rear of the chamber B and separated therefrom by the partition $e$, and provided with a stone, $e'$. A horizontal space, $e^2$, is left between the lower edge of this partition $e$ and the bottom of the heating-chamber, to allow the glass to pass from said chamber to the rolls F, F', and F², arranged adjacent to said partition and mounted on transverse shafts G, G', and G², whose ends have bearing in housing or brackets H on either side of the oven outside of the walls $a\,a'$.

I I' represent plates or guards, arranged one on each side of the stone $e'$ of the cooling-chamber E. The guard I is preferably stationary, while the opposite guard, I', is hinged to the bottom $i$ of the cooling-chamber, adjacent to the stone, and provided with an arm, $i'$, and pull-rod $i^2$, the latter extending through the side walls of the oven, to be manipulated from without.

J represents a semicircular apron or shield supported upon a cross-bar, J', within the oven, and arranged above the rolls to protect them from dust, &c.

We have represented in the drawings a set of three rolls, the roll F² having a spur-wheel, $f$, rigidly mounted on one end of its shaft outside of the side wall, and a drive-wheel, $f^2$, arranged on said shaft concentric with the spur-wheel $f$.

The adjacent ends of the shafts G and G' are also provided respectively with spur-wheels $g'$ and $g^2$, adapted to mesh with each other, and the former also meshing with the spur-wheel $f$ of the shaft $G^2$.

The rolls are designed to be operated from any suitable motor connected by a drive-belt or otherwise with the wheel $f'$, or the same may be operated by a crank. These rolls are preferably hollow, and may be provided with any desired impressions, stamps, or ornamental designs for the purpose of imparting such impressions to the glass during the rolling; or, if desired, the rolls may be corrugated, as shown in Fig. 7, to corrugate the glass.

L represents braces or standards secured to the side and end walls of the oven to support the top frame of the latter, consisting of longitudinal rods $l$ and horizontal rods $l'$.

Upon the projecting ends $l^2$ of the rods $l'$ are mounted pulleys $l^4$, over which pass chains N and N'. The chains N' are adapted to be secured at one end to the upper ends of the sliding gates of the oven and to receive weights at the opposite ends.

We will now describe the adjusting and regulating devices for the rolls.

The shafts G and G', Fig. 4, are adapted to bear at each end in boxes Z, the boxes of the lower roll being preferably formed in two sections, as shown, to facilitate adjustment.

On either side of the lower roll, F', is arranged a semi-bearing, $z$, for the shaft G'.

The boxes Z are each provided with a flange, $x$, and said boxes are adapted to fit in a vertical slot, $h$, of the housing or brackets H, the flanges $x$ resting against the outer sides of the housing, and adapted to be held in place by collars $y$ and set-screws $y'$.

The lower roll, F', is designed to be held stationary, while the upper roll, F, with its bearing-block, is adjustable in the slot $h$ by means of a set-screw, Y, and a weight, W, arranged on each side of the oven and secured to the chains N, which pass over adjacent pulleys above or above and below the shaft G, the lower ends, $n$, of said chains being secured to the outer ends of the shafts.

By the means thus described, the pressure of the upper roll may be regulated as desired. If it is found that said roll exerts too much pressure, (say three hundred pounds when only two hundred and fifty are required,) a weight (fifty pounds) is attached to the chain N', passing over an upper pulley, $l^4$, Fig. 2, and the roll thus counterbalanced. On the other hand, the weight of the upper roll may be increased by passing the chain N' first under a pulley, $l^6$, Fig. 1; or the pressure of the roll may be increased by simply turning the thumb-screw Y to prevent the raising of the bearing-blocks of the upper roll.

P represents the leer of the oven, having the usual track and car, and provided with a fire-box, $P^2$, and door P'.

$P^3$ represents an opening for the removal of broken glass from the heating-chamber of the oven. It is provided with a spout, $p$, and hinged cover $p'$.

Q is an opening in front of the heating-chamber for allowing the glass to be fed to the rolls. It is provided with a gate, $q$, adapted to slide in guideways $q'$.

K represents a side opening and trough for removing broken glass from the heating-chamber.

R represents an opening in the side wall of the oven to admit of access to the cooling-chamber to raise the flattened glass onto the car in the leer.

R' represents an opening in the opposite side of the oven to allow of the removal and renewal of the stone in the cooling-chamber.

S represents a discharge-trough for removing broken glass from the cooling-chamber.

We do not limit ourselves to the use of three rolls, as shown, as two rolls will answer to flatten the glass.

We are aware that flattening-rolls have heretofore been used for rolling molten glass, hence we make no broad claim to the application of rolls to glass-ovens; but we are not aware that the process hereinbefore described nor our improved construction and arrangement of devices have ever before been known.

Having fully described our invention, what we claim as new, and desire to secure by Letters Patent, is—

1. The process of flattening glass, consisting in first blowing the glass into cylinders, splitting the same, and then subjecting it to heat within a heating-chamber of a furnace, and finally passing it from the heating-chamber between flattening-rolls to a cooling-chamber, substantially as set forth.

2. In a combined heating and cooling oven, the combination, with a set of flattening-rolls arranged within the oven, of a curved or semicircular hood or screen supported above the rolls to protect the latter from dust, &c., substantially as set forth.

3. In a combined heating and cooling oven for glass, the combination, with the flattening-rolls and the stone of the cooling-chamber, of a stationary and a hinged guard arranged respectively one on either side of said stone, substantially as set forth.

4. In a combined heating and cooling oven for glass, the combination, with the flattening-rolls and their shafts, of pulleys mounted on the frame of the oven and chains passing around said pulleys and secured at one end to the upper shaft of the rolls and provided with weights at their opposite ends, substantially as set forth.

5. In a combined heating and cooling oven for glass, the combination, with the heating and cooling chambers, of a set of hollow flattening-rolls mounted on shafts, which latter are journaled in brackets or housing on each side of the oven and are provided with intermeshing gear-wheels, pulleys, and weighted chains, said chains being connected to the shaft of the upper roll and adapted to pass around the pulleys, substantially as set forth.

In testimony whereof we have signed this specification in the presence of two subscribing witnesses.

ALLEN D. STEVENSON.
GEORGE F. WILSON.

Witnesses:
ISAAC R. HOUK,
WM. D. McGITTIGEN.